D. J. Wilcoxson,
Windlass.
N° 24,967. Patented Aug 2, 1859.
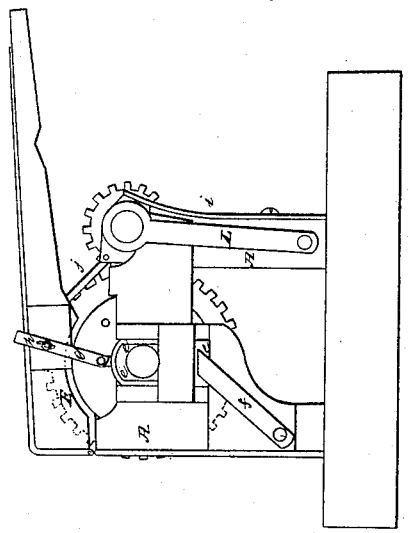
Fig: 2
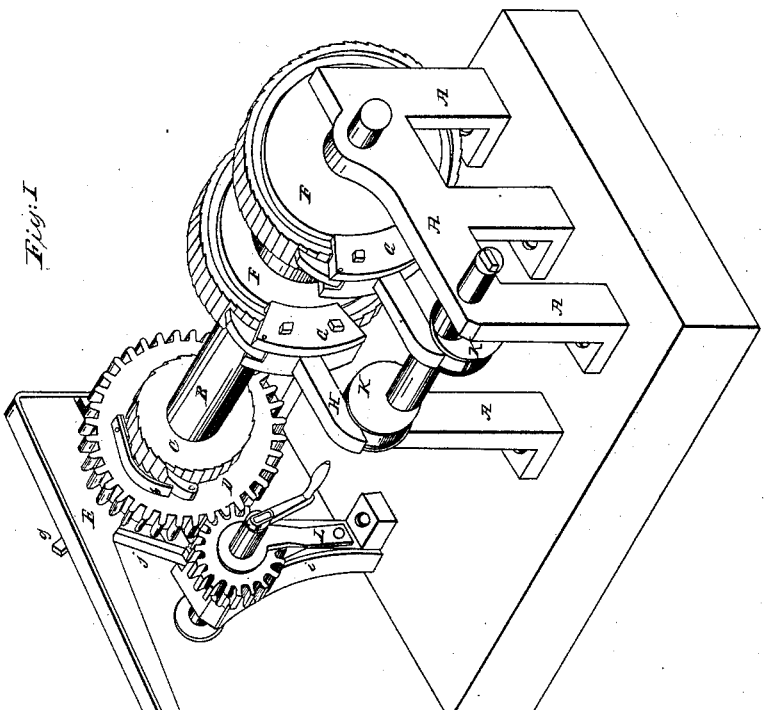
Fig: 1
Witnesses:
Inventor:
D. J. Wilcoxson D. J. Wilcoxson,
Windlass.
N° 24,967.
Patented Aug 2, 1859.
2 Sheets. Sheet 2.
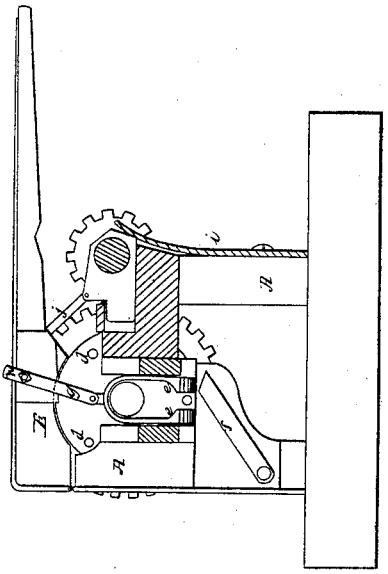
Fig: 4
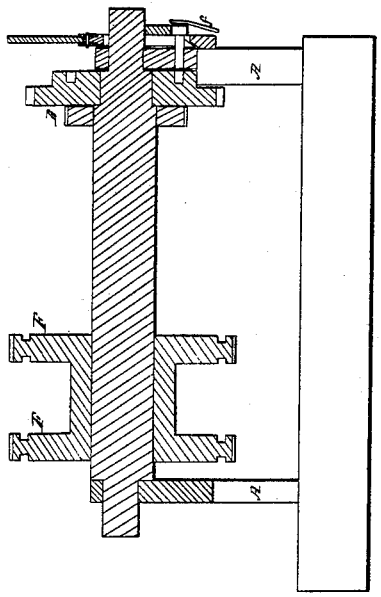
Fig: 3
Witnesses:
J. S. Smith
M. B. Radcliff
Inventor:
D. J. Wilcoxson

UNITED STATES PATENT OFFICE.

D. J. WILCOXSON, OF MILAN, OHIO.

SHIP'S HOISTING APPARATUS.

Specification of Letters Patent No. 24,967, dated August 2, 1859.

*To all whom it may concern:*

Be it known that I, D. J. WILCOXSON, of Milan, Erie county, State of Ohio, have invented certain new and useful Improvements in Ships' Hoisting Apparatus; and I hereby declare the following to be a full, clear, and exact description of the same, reference being had to the accompanying drawings, forming part of this specification, in which—

Figure 1. represents a hoisting apparatus embracing my improvements. Fig. 2. represents an end elevation of the same. Fig. 3. represents a section of the same on the line ($x$ $x$) of Fig. 1. Fig. 4. represents an end sectional elevation of the same.

The first part of my invention consists in attaching the ratchet or pawl to a friction plate or pulley loose on the hoisting shaft, but arranged so that it can be made fast to the frame, by which means the ratchet and pawl are always in connection with the shaft, either in hoisting or lowering, and the friction pulley only connected to the shaft when required to be brought into use.

The second part of my invention consists in connecting the friction brake with the friction pulley clutch, so that by the same movement of the brake, the clutch is released, the hoisting shaft set free, and the brake applied to the friction pulley to regulate the velocity of the shaft in lowering.

My invention finally consists in operating the vibrating hoisting pawls by means of cam levers, in connection with revolving eccentrics arranged so as to give an alternate reciprocating movement to the pawls.

In the accompanying drawings is represented my improved ships' windlass or hoisting apparatus, which consists of a strong iron or wooden frame (A) of the proper form, which is firmly secured to the deck of a vessel or to a platform. A hoisting shaft (B) of suitable size and shape, has its bearings in this frame, and to one end is secured a holding ratchet (C).

Contiguous to the ratchet and loose on the shaft is a friction plate (D), to which the ratchet pawl is pivoted, and is held against the ratchet by a spring ($b$) also attached to the pawl plate.

A clutch pin ($c$) passes through the frame, enters holes ($d$) in the friction plate, confines it to the frame and prevents it and the pawl from turning with the shaft.

The friction plate is released so that it and the pawl may turn with the shaft in lowering, by means of a forked shipper ($e$) which straddles the shaft, passes between the frame and the head of the clutch pin, and withdraws the clutch. A spring ($f$) pressing on the head of the clutch pin throws it into the holes in the friction plate, when the shipper is raised.

A friction brake (E) hinged to the frame acts on the periphery of the friction plate, and regulates the velocity of the shaft in lowering. This brake also operates the shipper through a link ($g$) which is hinged to the shipper and connected with the brake by a bolt passing through a long slot ($h$) in the upper end of the link. This slot allows the brake to be raised from off the friction and pawl plate, so that the shaft may run free without moving the shipper and clutching the plate.

The hoisting mechanism consists of two ratchet wheels (F) attached to the hoisting shaft and provided with vibrating pawl-plates (G) connected with and running in grooves in the sides of the ratchet wheels. From the back of the pawl plates (G) project cam levers (H) and the levers receive alternate reciprocating movement from two revolving ecentrics (K) by which a continuous rotary movement is given to the hoisting shaft.

When this apparatus is used for raising light weights, a toothed wheel and pinion may be used as the power, in which case the toothed wheel is made fast to the shaft, and the boxes of the pinion shaft attached to a lever (L) whose lower end is hinged to the frame as represented in the drawings, so that the pinion can be disengaged from the toothed wheel by being turned back. A link ($j$) extends from the lever in an inclined position toward the friction brake, and as the brake is brought down it strikes the link and disengages the pinion. A retracting spring ($i$) throws the pinion in gear when the friction lever is raised.

In hoisting with this machine the friction brake is raised, and with it the shipper, which releases the clutch pin and clamps the friction plate. The pawl now being fixed holds the hoisting shaft from turning except in direction of its movement in raising the weight. Power is applied to the eccentric shaft, by means of a crank or by any well known means, and motion given to the hoisting pawls which causes the windlass to turn and raise the weight. In lowering, the hoisting pawls are thrown out of gear with these ratchets, which brings the strain on the holding pawl, and through it on the friction plate. In depressing the friction brake, the clutch is withdrawn which leaves the pawl and friction plate free to turn backward with the hoisting shaft, and which is now held by the friction brake alone acting on the periphery of the friction plate, and by which the velocity of the hoisting shaft in lowering is regulated. Thus it will be seen that the holding pawl is always in gear with its ratchet and ready to act either in hoisting or lowering. In one position it performs the function of the ordinary fixed pawl, in the other it connects the friction pulley with the shaft. As the friction pulley is loose on the shaft and connected with it only when the shaft is turned backward in lowering, any mismanagement or binding of the brake has no effect to increase the power required to raise the weight.

The superior compactness in the arrangement of the power for operating the hoisting pawls by means of revolving eccentrics, gives great advantage to this hoisting mechanism over the ordinary arrangement of levers heretofore used, especially on board ship, when it is absolutely essential to economize space.

I do not confine myself to the precise form or arrangement of the loose friction plate and pawl, as described, as the pawl may be fixed to the shaft, and the teeth of the ratchet whel made in the friction plate.

This mechanism may with equal advantage be applied to a vertical hoisting apparatus, as the ship's capstan, or to the horizontal as shown in the drawings.

Having thus described my improvements in ships' windlasses or hoisting apparatus, what I claim therein as new and desire to secure by Letters Patent of the United States, is

1. Arranging the pawl and ratchet substantially as described, so as to allow the hoisting shaft to turn backward in lowering, without disconnecting the pawl from the ratchet.

2. Forming the connection between a friction pulley and hoisting shaft by means of a pawl and ratchet, substantially as described, so that the friction pulley is only in connection with the shaft while lowering.

3. The combination of the friction pulley friction brake and friction lever arranged substantially as described, so that by the movement of the brake, the friction pulley is released to revolve with the shaft, and power of the brake simultaneously applied to the pulley to regulate the velocity of the shaft in lowering.

4. Combination of the vibrating pawl plates (G) cam levers (H) and the eccentrics arranged as described to give motion to the hoisting shaft.

In testimony whereof I have subscribed my name.

D. J. WILCOXSON.

Witnesses:
A. HERBERT,
F. SOUTHGATE SMITH.